United States Patent [19]

Lieberman et al.

[11] 3,935,121

[45] Jan. 27, 1976

[54] FOAM CONTROL COMPOSITIONS FOR AQUEOUS SYSTEMS, ITS PREPARATION, AND PROCESS USING SAME

[75] Inventors: Hillel Lieberman, Warminster; Anthony J. Graffeo, Willow Grove; John S. Kucsan, Philadelphia, all of Pa.

[73] Assignee: Betz Laboratories, Inc., Trevose, Pa.

[22] Filed: June 29, 1973

[21] Appl. No.: 374,835

[52] U.S. Cl. ................ 252/321; 162/158; 252/358
[51] Int. Cl.² ........................................ B01D 19/04
[58] Field of Search .......................... 252/321, 358

[56] References Cited
UNITED STATES PATENTS

| | | | |
|---|---|---|---|
| 2,603,599 | 7/1952 | Trautman | 252/358 X |
| 3,677,963 | 7/1972 | Lichtman et al. | 252/358 |

*Primary Examiner*—Richard D. Lovering
*Attorney, Agent, or Firm*—Alexander D. Ricci; Steven H. Markowitz

[57] ABSTRACT

A foam control composition, and methods for its production and use, is disclosed, which comprises a liquid hydrocarbon carrier, an organic emulsifier, an amide of a fatty acid, and, optionally, a silicone oil. Composition is useful in controlling foam encountered in preparation of paper pulp, resinous materials, and in the treatment of waste systems and cooling towers. The foam control composition is prepared by (a.) combining the amide, emulsifier and from about 1/5 to about 1/2 of the liquid hydrocarbon carrier, (b.) heating until a clear melt is obtained, (c.) rapidly adding to said melt the remainder of said liquid hydrocarbon carrier to cool the melt to a temperature of from ca. 150°F. to ca. 200°F., and (d.) allowing the cooled mixture to further cool to a temperature of from about ambient to about 135°F.

4 Claims, No Drawings

FOAM CONTROL COMPOSITIONS FOR AQUEOUS SYSTEMS, ITS PREPARATION, AND PROCESS USING SAME

BACKGROUND OF THE INVENTION

Foam of course, is a most undesirable by-product in most industries since it does have a direct and drastic effect upon production efficiency and accordingly the economics of a system or process. In some systems, foam can be tolerated to a certain extent; however, in most systems such as the pulp and paper producing processes, the quality of the product is dependent upon the control of foam.

At present there are a number of different chemical pulping processes finding extensive use in the industry. However, by far the most widespread are the alkaline pulping processes commonly referred to as the "soda" and the "kraft" processes.

Kraft pulp, also referred to as sulfate pulp, represents one type of chemical pulp. It is, perhaps, the most important of the chemical pulps, as indicated by the increased number of kraft pulp mill installations and by the fact that many of the mills now under construction are planning to utilize the kraft process. The reasons for the popularity of this process are many among which can be mentioned the strength of the resultant pulp, the varieties of wood that lend themselves to this process, and the excellent degree of chemical recovery of cooking liquors which is possible.

Because kraft provides the strongest pulp, its primary use is where strength is an important consideration. Kraft is used for making wrapping paper, grocery bags, heavy duty shipping bags, cartons, etc. It is also mixed with other types of pulp where added strength is required.

The kraft process is an alkaline process with the active cooking chemicals being caustic soda and sodium sulfide. The presence of the sodium sulfide is what makes the kraft process different from the soda process.

In the kraft process, measured quantities of standard sized chips are directed to a digester which is a tall cylindrical pressure vessel with a conical bottom. Briefly stated, in addition to the wood chips, white liquor (which is the cooking liquor, the active chemical ingredients of which are caustic soda and sodium sulfide) and steam are charged to the digester. Through the action of the cooking liquor and steam on the chips, the lignin binder is dissolved, freeing the cellulose fibers, thus the chips are converted into a brown colored kraft pulp. The cooking is performed normally at pressures varying from 80 – 110 psi. Although the active chemicals in the cooking liquor (white liquor) are caustic soda and sodium sulfide, the liquor will also contain some sodium carbonate and some sodium sulfate. The kraft process is sometimes called "sulfate" because sodium sulfate (saltcake) is the makeup chemical for converting the black liquor to white liquor.

In the cooking process in the digester, the white liquor becomes black as it is spent in cooking. After the cook, the pulp and black liquor are blown out of the digester to a blow pit and directed over a knot screen and then to vacuum washers, at which point the black liquor is separated from the pulp. The pulp is then sent to the bleach plant, or if unbleached kraft is to be used, the pulp is directed to the paper mill.

The pulp washing, which accomplishes the removal of the black liquor from the pulp, is the point at which brown stock defoamers and drainage aids are required. A screening operation usually precedes the washing stage to remove any knots which may be ejected from the digester into the blow tank. The washing takes place in a group of washers connected in series and is countercurrent.

Weak liquor removed from the pulp on the last washer is sprayed on the pulp on the previous washer. This continues back to the first washer. By using this process, the pulp is always washed by a liquor of lower solids content that the pulp itself contains. This permits removal of solids from the pulp with minimum fresh water requirements.

As earlier stated, although the soda and kraft processes possess distinct advantages with respect to the reclaiming and reuse of the spent chemicals, the processes do possess inherent disadvantages due to the foaming problems which are encountered at various steps in the process. The most troublesome areas are at the pulp washing, screening and knotting stages of the operation. During these stages a considerable amount of troublesome foam is generally formed. Likewise, when the resulting pulp is being washed in the brown stock washers to remove residual chemicals commonly referred to as black liquor, a significant foam problem is encountered. A black liquor contains from 13 to 20% by weight of dissolved solids and has a pH in the range of from about 11 to 13. Because of the constitution of the black liquor, that is, its resin content, its dissolved solids content and the ph of the system, there is a definite foaming potential, which if allowed to occur, affects the entire system deleteriously.

Foam is equally encountered after the pulp has left the brown stock washers and has traveled to the screenroom where the pulp is again diluted with water and passed through the various screening operations. Thiss operation allows the satisfactory fibers to pass through while the clumps of unpulped fibers, knots or other foreign material is retained on the screen. In addition, foam becomes quie significant in the screenroom where the diluted pulp containing a small residual amount of black liquor is subjected to violent agitation by the screen. The black liquor removed during the screening operation is normally used as the dilution water in in the various stages of the brown stock washers; therefore, since the diluted black liquor still contains a minor amount of solids, a foaming potential exists.

The foaming problems encountered at various stages of the operation are dependent upon a number of factors of which may be mentioned the type wood used in the pulp making process, the conditions, e.g., temperature and the extent of agitation, the amount and type of undissolved solids dispersed in the liquor and the dissolved materials in the liquor. It is common in some pulping processes to find that foaming is not a particular problem at one stage but that it does become such at a later stage as when the liquor or effluent of one stage is returned to the system as a washing or diluting agent at another stage of the operation.

Since the foaming problems do have a significant effect on the efficiency of the pulp producing process and since the economics of the pulp producing system itself are greatly affected, many defoaming compositions have been proposed for use during the stages of operation in question. The various defoamers recommended for use, although possessing distinct advantages in some aspects, also possess attendant disadvantages. For example, a formulated defoamer or antifoaming agent may be satisfactory with one particular type wood such as spruce or fir, but may not be at all successful in retarding foam where the fibers are derived from hemlock. Moreover, it is not unusual to find differences when the same type wood is utilized to produce a pulp. The conditions of the operation in one instance may be such as to render a defoaming wholly inoperable while at the same time this same defoamer may be perfectly successful in another similar process. The differences in the respective operations can be attributed to the relative differences in temperature, the type water used and the respective agitation and/or aeration times utilized.

Another important consideration is the cost involved. Although a particular defoamer may have successfully inhibited the foaming potential of a particular system, the feed rate and the initial cost of a defoamer or drainage aid may be such as to make its use prohibitive. Accordingly, it can be appreciated that when all of the factors are considered, it is extremely difficult to formulate a particular composition which will not only perform the function desired but which will also be operable at the specific feed rates demanded by the mills. With the foregoing in mind, the present inventors embarked upon a comprehensive study in an attempt to produce a defoamer or antifoaming agent which would fulfill as many of the prerequisites as possible. The primary objective of course, was to obtain a defoaming composition which would not only satisfy the demands of all of the systems wherein the alkaline pulp producing process is utilized, but also one which would be economically desirable to the mill.

SUMMARY OF THE INVENTION

With the above-defined objectives as a goal, it was discovered that the foam potential of a particular aqueous system could be inhibited and/or that existing foam in a system could be eliminated by adding thereto a composition which comprises:

A. A liquid hydrocarbon carrier which may be any aliphatic, alicyclic or aromatic hydrocarbon or mixture thereof which is liquid at room temperatures;

B. An emulsifier which may be cationic, anionic or non-ionic, or a mixture thereof, depending upon the particular application for which the foam controller is intended;

C. An amide obtained by the reaction of a polyamine containing an alkylene group of 2 to 6 carbons with a fatty acid or mixture of fatty acids having an average composition of 6 to 22 carbons per acid molecule; and, preferably, but not essentially, D. A silicone oil which may be any alkyl, aryl, alicyclic or alkylaryl siloxane or polysiloxane having viscosities from about 10 to 1000 centistokes at 25° C.

Generally, the hydrocarbon carrier, the emulsifier and the amide are combined and heated with agitation until a clear melt is obtained. The mixture is then cooled somewhat rapidly and, if desired, the silicone oil is added.

DETAILED DESCRIPTION OF THE INVENTION

Specifically, the foam control composition of this invention is comprised of from about 1% to about 10% of the amide, from about 1% to about 10% of the emulsifier, from about 88% to about 98% of the hydrcarbon carrier, and 0% to about 2% of the silicone oil.

The process by which the composition is made is critical. Preferably, the amide, emulsifier and from one-fifth to one-half of the oil carrier are heated with agitation until a clear melt is obtained. The remainder of the oil is quickly added to effect a rapid cooldown to about 150° F to 200° F. The batch is then cooled to about ambient to 135° F in 2 to 3 hours, and then, if desired, the silicone oil is added and stirred until the mixture is homogeneous. Alternatively, all the oil may be added initially so long as the melt is then rapidly cooled by other means down to about 150° F to 200° F, i.e., in about 2 hours.

The effective treatment levels for the inventive composition were determined to be within the range of from about 0.01 to about 1% by weight of the defoamer based upon the weight of the dry solids content of the aqueous system.

Although treatment levels above 1% are successful in controlling foam, the use of excesses above this level are prohibitive due to cost considerations.

The defoamer compositions of this invention were tested for their effectiveness by the following procedure: 500 milliliters of concentrated paper mill stock is charged into a glass vessel; an amount of the defoamer to be treated is introduced into the vessel; a pump is used to circulate the stock from the base of the vessel to a hose and nozzle assembly through which a stream of the liquid is made to impinge upon the surface of the sample in the vessel; the amount of foam generated is measured at 30 second intervals over a test period of two minutes; in some cases, the foam level reaches the top of the vessel (180 milliliters) in less than two minutes; in these cases, the elapsed time is recorded; foam height and/or top time is a good measure of the relative effectiveness of the defoamer.

The following examples illustrate the invention:

EXAMPLE 1

A composition with the following ingredients was prepared:
  a. ethylene bis stearamide — 3%
  b. diethylene glycol mono-oleate — 2%
  c. hydrocarbon carrier — 94.5% (one-third mineral seal oil and two-thirds process oil, Tufflo 15, Arco)
  d. silicone oil (Union Carbide L-45) — 0.5%

The diamide, mono-oleate, and the mineral seal oil were heated together until a clear melt was obtained at about 250° F. The process oil was then rapidly added with vigorous agitation which quickly cooled the batch down to about 175° F. It was then allowed to cool to about 100° F., at which time the silicone oil was stirred in.

EXAMPLE 2

Same as Example 1 except that no silicone oil was added.

EXAMPLE 3

Same as Example 1 except that final cooldown to 100° F. was lengthened to cover 4 hours.

EXAMPLE 4

Same as Example 1 except that only one-fifth of the oil was present in the initial melt, and final batch temperature was about 135° F.

EXAMPLE 5

Same as Example 1 using a different brand of the diamide.

EXAMPLE 6

Same as Example 1 except that the ethylene bis stearamide was replaced by ethylene bis ricinoleamide.

EXAMPLE 7

Same as Example 1 except that the silicone oil (Union Carbide, L-45) which is a dimethyl polysiloxane, was replaced by a methyl hydrogen polysiloxane.

EXAMPLE 8

The ingredients of Example 1 were heated together with agitation all the oil being present, until a clear melt was obtained. The batch was cooled to 180° F over a period of two hours. In two more hours, the batch was cooled to 100° F. Then the silicone oil was stirred in.

EXAMPLE 9

Same as Example 8 except that the mono-oleate was replaced by a complex organic phosphate ester (2% GAFAC RD 510).

EXAMPLE 10

Same as Example 8 except that the batch was passed once through a colloid mill (set at 0.007") between initial and final cooldown.

The composition prepared according to the above examples were tested for their antifoaming ability using the test procedures described above. Each composition was tested on two different samples of paper mill stock. Table 1 reports the results using a 100% concentration Southern pulp mill black liquor, containing about 15% solids. A blank sample was foamed without treating with a defoamer, and topped the vessel in only 10 seconds. In all cases, 100 microliters of the test defoaming composition was added to the pulp mill liquor.

Table 2 data was obtained using a 100% concentration Mid-Atlantic pulp mill liquor containing about 18% solids. The untreated blank topped in only 6 seconds. Defoamer dosage was again about 100 microliters per sample.

TABLE 2

| EXAMPLE | COMPOSITION | FOAM HEIGHT (Milliliters) AT | | | | TOP TIME (Seconds) |
|---|---|---|---|---|---|---|
| | | 30 Seconds | 60 Seconds | 90 Seconds | 120 Seconds | |
| 21 | Example 1 | 45 | 85 | — | — | 82 |
| 22 | Example 2 | 85 | — | — | — | 55 |
| 23 | Example 3 | 50 | 80 | — | — | 88 |
| 24 | Example 4 | 80 | — | — | — | 49 |
| 25 | Example 5 | 85 | — | — | — | 48 |
| 26 | Example 6 | 125 | — | — | — | 37 |
| 27 | Example 7 | 85 | — | — | — | 42 |
| 28 | Example 8 | 80 | — | — | — | 50 |
| 29 | Example 9 | 75 | 135 | — | — | 63 |
| 30 | Example 10 | 70 | 180 | — | — | 60 |

The above two tables demonstrate the defoaming effectiveness of the compositions and process of this invention.

Just prior to filing the instant patent application, a U.S. patent was issued to Hart Chemical, Ltd., of Canada, Shane, et. al., U.S. Pat. No. 3,723,342, Mar. 27, 1973. This patent discloses a somewhat similar defoaming composition for use in paper and pulp mills. One major difference between the compositions of Shane, et. al., and those of the instant invention is that the particle size of the resultant batch of the Shane composition is required to be from 4 to 7 on the Hegman scale, while the particle sizes of the compositions of the instant invention are not critical. However, the processes by which the respective compositions are made are more distinguishable in that the Shane process, disclosed at column 5, Example 1, takes considerably more time than that of the instant invention.

However, because of the general similarity of composition, the applicants decided to test the antifoaming performance of their compositions against that of Shane, et. al. To that end, batches of the compositions described in Shane's Examples 1 and 2 were prepared according to the procedures given in those Examples. That procedure is considerably longer due to the need for milling the diamide down to Hegman scale size, and the six-hour intermediate hold time. Compositions of the instant invention were prepared according to the above Example 1. The test vessel was charged with about 540 milliliters of a 100% concentrated Mid-Atlantic pulp mill soft wood black liquor, containing about 14% solids. The test procedure was basically the same as before for Tables 1 and 2, except that the volume to the top of the vessel was 140 milliliters instead of 180. The time for an untreated blank sample to top the vessel was about 8 seconds. Table 3 summarizes the results.

TABLE 1

| EXAMPLE | COMPOSITION | FOAM HEIGHT AT (Milliliters) | | | | TOP TIME |
|---|---|---|---|---|---|---|
| | | 30 Seconds | 60 Seconds | 90 Seconds | 120 Seconds | |
| 11 | Example 1 | 45 | 75 | 125 | — | 101 Sec. |
| 12 | Example 2 | 60 | 130 | — | — | 65 Sec. |
| 13 | Example 3 | 50 | 80 | 130 | — | 99 Sec. |
| 14 | Example 4 | 70 | 135 | — | — | 61 Sec. |
| 15 | Example 5 | 70 | — | — | — | 58 Sec. |
| 16 | Example 6 | 75 | — | — | — | 45 Sec. |
| 17 | Example 7 | 80 | — | — | — | 52 Sec. |
| 18 | Example 8 | 63 | 30 | — | — | 62 Sec. |
| 19 | Example 9 | 45 | 85 | — | — | 75 Sec. |
| 20 | Example 10 | 60 | 00 | — | — | 70 Sec. |

TABLE 3

| COMPOSITION | AMT ADDED | FOAM HEIGHT (Milliliters) AT | | | | TOP TIME |
|---|---|---|---|---|---|---|
| | | 30 Seconds | 60 Seconds | 90 Seconds | 120 Seconds | (Seconds) |
| Shane Ex 1 | 60 | 140 | — | — | — | 30 |
| Shane Ex 2 | 60 | — | — | — | — | 15 |
| Instant Ex 1 | 60 | 80 | 100 | 140 | — | 90 |
| Shane Ex 1 | 70 | — | — | — | — | 22 |
| Shane Ex 2 | 70 | — | — | — | — | 12 |
| Instant Ex 1 | 70 | 75 | 90 | 120 | — | 98 |
| Shane Ex 1 | 100 | — | — | — | — | 28 |
| Shane Ex 1 | 100 | — | — | — | — | 20 |
| Shane Ex 2 | 100 | — | — | — | — | 10 |
| Instant Ex 1 | 100 | 75 | 95 | — | — | 83 |
| Shane Ex 1 | 120 | 90 | 95 | 80 | 80 | Did Not Top |

The above results clearly indicate that at dosage levels less than 120 microliters, the compositions of this invention give superior anti-foaming effects compared to those of Shane, et. al. Treatment levels higher than that are not acceptable because of economic considerations. The results would indicate that the compositions of this invention can be used at much lower levels, and be effective, than those of the Shane patent. Moreover, the process by which the latter are made lasts three to four times as long as the process of this invention.

Having thus described the invention what is claimed is:

1. A process for preparing a foam control composition for aqueous systems, said composition consisting essentially of from about 1% to about 10% of an amide, from about 1% to about 10% of an emulsifier, from about 88% to about 98% of a liquid hydrocarbon carrier, and from 0% to about 2% of a silicone oil, which process comprises:

a. Combining the amide, the emulsifier, and from about 1/5 to about ½ of said liquid hydrocarbon carrier;
   b. Heating the amide, emulsifier, and the liquid hydrocarbon carrier amount until a clear melt is obtained;
   c. Rapidly adding to said melt the remainder of said liquid hydrocarbon carrier to cool the melt to a temperature of from about 150°F. to about 200°F.;
   d. Allowing the cooled mixture to further cool to a temperature of from about ambient to about 135°F.; all said percentages being on a weight basis and wherein said amide is obtained by the reaction of a polyamine containing an alkylene group of from 2 to 6 carbons, with a fatty acid or a mixture of fatty acids, having an average composition of 6 to 22 carbons per acid molecule.

2. The process of claim 1 further comprising a final step of adding up to 2% of a silicone oil to the mixture.

3. The product of the process of claim 2.

4. A process for controlling the foam of an aqueous system, which comprises adding to said system an effective amount of the product of claim 3.

* * * * *